United States Patent
Minor (10) Patent No.: US 11,861,774 B2
(45) Date of Patent: Jan. 2, 2024

(54) METHODS FOR CLOTH SIMULATION FOR ANIMATION

(71) Applicant: David Sebastian Minor, Vancouver (CA)

(72) Inventor: David Sebastian Minor, Vancouver (CA)

(73) Assignee: Digital Domain Virtual Human (US), Inc., Los Angeles, CA (US)

( * ) Notice: Subject to any disclaimer, the term of this patent is extended or adjusted under 35 U.S.C. 154(b) by 8 days.

(21) Appl. No.: 17/749,107

(22) Filed: May 19, 2022

(65) Prior Publication Data

US 2023/0377235 A1 Nov. 23, 2023

(51) Int. Cl.
*G06T 13/20* (2011.01)

(52) U.S. Cl.
CPC .......... *G06T 13/20* (2013.01); *G06T 2210/16* (2013.01); *G06T 2210/21* (2013.01)

(58) Field of Classification Search
CPC .. G06T 13/20; G06T 2210/16; G06T 2210/21
See application file for complete search history.

(56) References Cited

U.S. PATENT DOCUMENTS

| 5,905,507 A * | 5/1999 | Rossignac ................. G06T 9/40 345/440 |
| 10,546,433 B2 * | 1/2020 | Lin .......................... G06T 7/62 |
| 11,250,187 B2 * | 2/2022 | Cirio ....................... G06F 17/12 |
| 2009/0018803 A1 | 1/2009 | Ko et al. |
| 2014/0114620 A1 * | 4/2014 | Grinspun ............... A41H 3/007 703/1 |
| 2019/0043269 A1 * | 2/2019 | Lin .......................... G06T 7/62 |
| 2019/0139303 A1 * | 5/2019 | Leong ..................... G06F 30/20 |

OTHER PUBLICATIONS

Volino et al., "Accurate collision response on polygonal meshes", May 5, 2000.
ADMM ⊇ Projective Dynamics: Fast Simulation of Hyperelastic Models with Dynamic Constraints. M. Overby, G. Brown, J. Li, and R. Narain. IEEE Trans. Vis. Comput. Graph. 23 (10): 2222-2234 (2017).

* cited by examiner

*Primary Examiner* — Michael Le
(74) *Attorney, Agent, or Firm* — Todd A. Rattray; Oyen Wiggs Green & Mutala LLP (57) ABSTRACT

Example embodiments of the described technology provide methods for generating quasistatic models of textile and/or skin tissue objects for computer animation. The method may comprise optimizing an energy function defining a cloth object to minimize stretching and bending. The method may also comprise modeling collisions of the cloth object with one or more surfaces of an underlying collision object. In some embodiments the collisions are modelled with inequality constraints.

20 Claims, 2 Drawing Sheets

METHODS FOR CLOTH SIMULATION FOR ANIMATION

FIELD

The present disclosure relates to methods for computer animation. Some embodiments provide methods useful for simulating textiles (e.g. clothing) and/or skin tissue.

BACKGROUND

Relatively recently, two-dimensional and three-dimensional computer-based graphic (CGI) simulations have been developed which use computer-based models to simulate the movement of objects as between digital image frames and to thereby provide data which can be used to animate moving objects within a sequence of digital image frames.

CGI simulation may often include simulation and/or animation of musculoskeletal systems comprising a rigid-body (e.g. skeletal) system and a system of deformable, but volume preserving solids (e.g. soft tissue, such as muscle and fat), which interacts with the rigid-body system. Such animation may simulate movement of the musculoskeletal system. Such simulations may be used to generate corresponding animations of the musculoskeletal systems and/or similar systems, which animations comprise ordered sequences of complete or partial digital image frames often referred to as "Computer-Generated Imagery" (CGI) video data, CGI animation data or CGI moving picture data. There is a general desire that such animations, when rendered by suitable computer-based graphics engines, provide musculoskeletal animation that appears realistic to viewers.

Cloth simulation is commonly used in CGI productions to simulate clothed characters, anatomical effects of the cloth and/or the like. It is common to model cloths using dynamic simulations. However, to examine a specific pose of a CGI simulated character in a dynamic simulation, all frames leading up to that pose must be simulated as well. This increases complexity of the simulation, an amount of time that is required to generate the simulation, computing power that is required to generate the simulation, etc.

Additionally, simulations which require any dynamic element typically are inherently more complex as the frame to frame dependencies of the dynamic effects must be incorporated into any simulation model that is being generated.

There is a need for improved methods for modeling textile and/or skin tissue objects.

SUMMARY

Further aspects and example embodiments are illustrated in the accompanying drawings and/or described in the following description.

This invention has many aspects. These include (non-limiting):
methods for simulating textiles and/or skin tissue;
methods for finding a dynamic equilibrium of a textile and/or skin tissue to be simulated;
methods for modelling collision of a textile and/or skin tissue object with one or more surfaces of an underlying object;
methods for generating a quasistatic (or stateless) model of a textile and/or skin tissue object;
etc.

One non-limiting aspect of the invention provides a method for generating a quasistatic simulation model of a cloth object for use in a computer-based animation simulation. The method comprises: receiving a mesh representation of the cloth object, the cloth object mesh representation comprising: a plurality of cloth vertices and the locations of the plurality of cloth vertices in a three-dimensional (3D) coordinate system and cloth edges connecting pairs of cloth vertices to define cloth triangles of a triangular cloth surface mesh; receiving a mesh representation of a collision object, the collision object mesh representation comprising: a plurality of collision-object vertices and the locations of the plurality of collision-object vertices in the 3D coordinate system and collision-object edges connecting pairs of collision-object vertices to define collision-object triangles of a triangular collision-object surface mesh; and performing an iterative optimization which minimizes an energy function comprising a stretching term representative of a stretching energy of the cloth object and a bending term representative of a bending energy of the cloth object to thereby obtain a dynamic equilibrium model of the cloth object. The stretching term and the blending term are based at least in part on the cloth object mesh representation. Performing the iterative optimization comprises modelling collisions of the cloth object with the collision object.

Performing the iterative optimization may comprise performing a constrained optimization wherein minimizing the energy function is subject to one or more inequality constraints which prevent interpenetrating collisions of the cloth object with the collision object.

The energy function may comprise one or more cost terms which penalize interpenetrating collisions between the cloth object and the collision object.

The energy function may comprise an equation of the form:

$$E = k_B \left( \sum_{vertices, i} E(v_i) \right) + k_S \left( \sum_{triangles, j} E(F_j) \right) \quad (1B)$$

wherein: $k_B(\sum_{vertices,i} E(v_i))$ is the bending term; $k_S(\sum_{triangles,j} E(F_j))$ is the stretching term; $k_B$ is a configurable weight parameter corresponding to the bending energy; $k_S$ is a configurable weight parameter corresponding to the stretching energy; $E(v_i)$ is a bending energy metric of the cloth object at an $i^{th}$ cloth vertex $v_i$; i is an index of the cloth vertices; $E(F_j)$ is a stretching energy metric of the cloth object at a cloth triangle j; $F_j$ is a deformation gradient tensor for the $j^{th}$ cloth triangle; and j is an index of the cloth triangles.

The bending energy metric $E(v_i)$ may be given by an equation of the form:

$$E(v_i) = (|\vec{v_i} - \vec{v_i}'| - L_O)^2 A_i \quad (2)$$

wherein: $\vec{v_i}$ is the location of the $i^{th}$ cloth vertex $v_i$; $\vec{v_i}'$ is an average of the locations of the cloth vertices that are neighbors to the $i^{th}$ cloth vertex $v_i$; $L_O$ is a desired distance between $\vec{v_i}$ and $\vec{v_i}'$; and $A_i$ corresponds to an area of the cloth triangles that include the $i^{th}$ cloth vertex $v_i$.

The stretching energy metric $E(F_j)$ may be given by an equation of the form:

$$E(F_j) = \|F_j - R(F_j)\|^2 A_j \quad (3)$$

wherein: $R(F_j)$ corresponds to a polar decomposition of $F_j$.

The deformation gradient tensor $F_j$ for the $j^{th}$ cloth triangle is given by an equation of the form:

$$F_j = R_j^* S_j \quad (4)$$

wherein: $\underline{R}_j$ represents a rotation matrix and $\underline{S}_j$ is a right stretch tensor.

The energy function may further comprise a gravitational term representative of gravitational forces acting on the cloth object. The energy function may comprise an equation of the form:

$$E = k_B\left(\sum_{verticies,i} E(v_i)\right) + k_S\left(\sum_{triangles,j} E(\underline{F}_j)\right) + k_g\left(\sum_{verticies,i} y_i\right)$$

wherein: $y_i$ corresponds to gravitational forces experienced by the $i^{th}$ vertex; and $k_g$ is a configurable weight parameter corresponding to the corresponding to the gravitational energy.

The energy function may further comprise an air pressure term representative of air pressure acting on the cloth object. The energy function may comprise an equation of the form:

$$E = k_B\left(\sum_{verticies,i} E(v_i)\right) + k_S\left(\sum_{triangles,j} E(\underline{F}_j)\right) + k_a\left(\sum_{verticies} (\vec{n_i}\cdot\vec{v_i})A_i\right)$$

wherein: $\vec{n_i}$ is a normal vector extending from the $i^{th}$ vertex ($v_i$); and $k_\alpha$ is a constant corresponding to the air pressure.

The energy function may further comprise a gravitational term representative of gravitational forces acting on the cloth object and an air pressure term representative of air pressure acting on the cloth object. The energy function may comprise an equation of the form:

$$E =$$

$$k_B\left(\sum_{verticies,i} E(v_i)\right) + k_S\left(\sum_{triangles,j} E(\underline{F}_j)\right) + k_g\left(\sum_{verticies,i} y_i\right) + k_a\left(\sum_{verticies} (\vec{n_i}\cdot\vec{v_i})A_i\right)$$

wherein: $y_i$ corresponds to gravitational forces experienced by the $i^{th}$ vertex; $k_g$ is a configurable weight parameter corresponding to the corresponding to the gravitational energy; $\vec{n_i}$ is a normal vector extending from the $i^{th}$ vertex ($v_i$); and $k_\alpha$ is a constant corresponding to the air pressure.

Performing the iterative optimization may comprise, for each cloth vertex ($v_i$) from among a plurality of cloth vertices, tracking a point ($p_i$) on the collision object that is closest to the cloth vertex ($v_i$) through each iteration of the iterative optimization.

Tracking the point ($p_i$) on the collision object may comprise: identifying a collision-object triangle to which the point ($p_i$) belongs; and determining barrycentric coordinates for the point ($p_i$) relative to the collision-object vertices ($u_{i,1}$, $u_{i,2}$, $u_{i,3}$) of the identified collision-object triangle.

Performing the iterative optimization comprises, for each cloth vertex ($v_i$) from among the plurality of cloth vertices: determining a plane that is tangent to collision object at the point ($p_i$); and requiring that the cloth vertex ($v_i$) does not cross the plane that is tangent to the collision object at the point ($p_i$).

The method may further comprise determining a normal vector $\vec{n_i}$ to the plane that is tangent to the collision object at the point ($p_i$). Requiring that the cloth vertex ($v_i$) does not cross the plane that is tangent to the collision object at the point ($p_i$) may comprise imposing an inequality constraint of the form:

$$(\vec{v_i}-\vec{p_i})\cdot\vec{n_i}\geq 0. \quad (7)$$

wherein: $\vec{v_i}$ is a position of the cloth vertex ($v_i$); $\vec{p_i}$ is a position of the point ($p_i$) on the collision object; and $\vec{n_i}$ to the plane that is tangent to the collision object at the point ($p_i$).

Determining the normal vector $\vec{n_i}$ to the plane that is tangent to the collision object at the point ($p_i$) may comprise interpolating individual normal vectors ($\vec{n}_{i,1}$, $\vec{n}_{i,2}$, $\vec{n}_{i,3}$) at a plurality of collision-object vertices ($u_{i,1}$, $u_{i,2}$, $u_{i,3}$) that define the collision object triangle that includes the point ($p_i$).

Determining the normal vector $\vec{n_i}$ to the plane that is tangent to the collision object at the point ($p_i$) may comprise interpolating individual normal vectors ($\vec{n}_{i,1}$, $\vec{n}_{i,2}$, $\vec{n}_{i,3}$) according to an equation of the form ($\vec{n}_i = \lambda_{i,1}\vec{n}_{i,1} + \lambda_{i,2}\vec{n}_{i,2} + \lambda_{i,2}\vec{n}_{i,2}$ wherein ($\lambda_{i,1}$, $\lambda_{i,2}$, $\lambda_{i,3}$) are the barycentric coordinates of the point ($p_i$) relative to the collision-object vertices ($u_{i,1}$, $u_{i,2}$, $u_{i,3}$) of the collision object triangle that includes the point ($p_i$).

It is emphasized that the invention relates to all combinations and sub-combinations of the above features and other features described herein, even if these are recited in different claims or claims with different dependencies.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
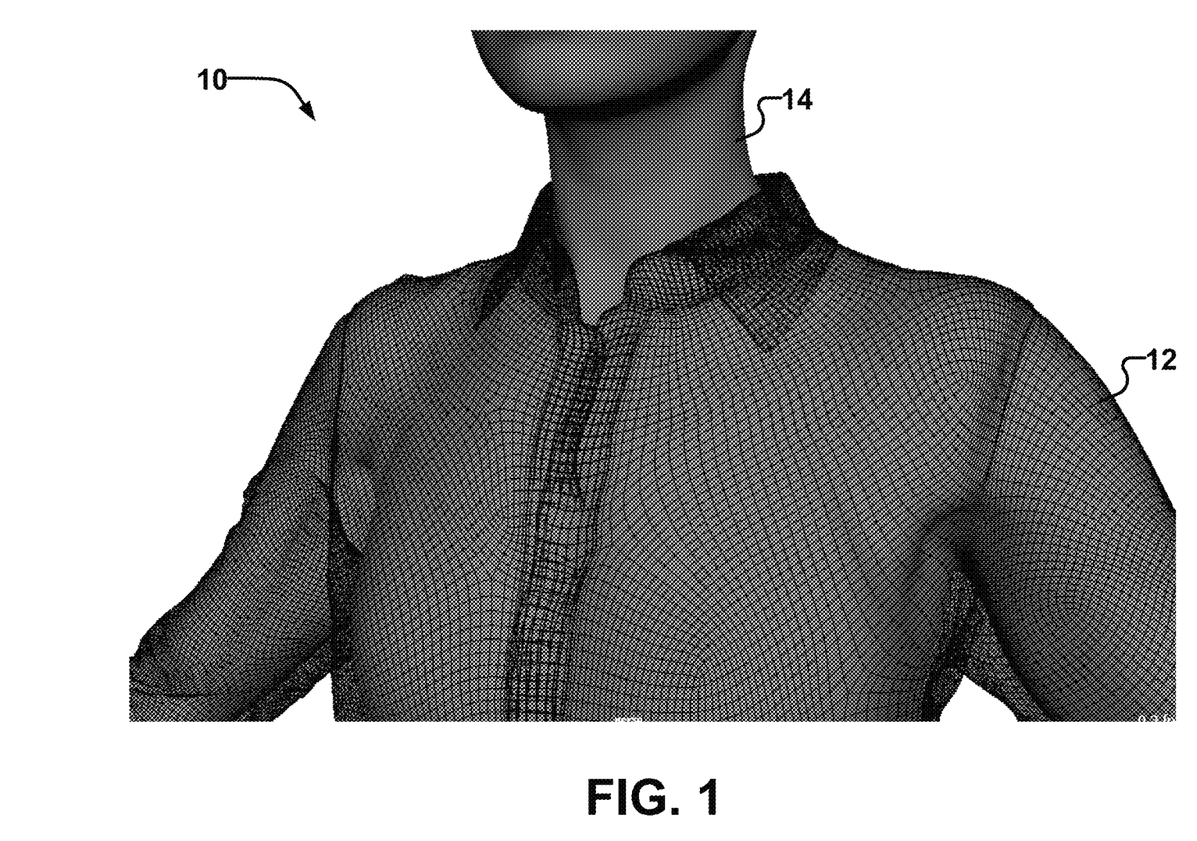
FIG. 1 is a schematic illustration of an example animation simulation model according to a particular embodiment.

FIG. 1 schematically illustrates an animation model 10 which comprises a cloth object (in the illustrated example, a shirt) 12 at least partially surrounding or enclosing or covering an underlying collision object 14 (in the illustrated example, a human body or musculoskeletal system). For the purposes herein "cloth object" means a model of an object which is tight-fitting around the collision object 14 (e.g. sufficiently tight-fitting that secondary motion that is independent of object 14 (e.g. "flapping") is not relevant or important for simulation purposes). Cloth object 12 may comprise a model of skin tissue located, for example, around a collision object 14 made up of muscle and/or bone tissue (a musculoskeletal system)) or textiles (e.g. articles of clothing), located around a collision object 14 made up of a musculoskeletal system with or without its own skin tissue. The textiles may, for example, comprise pants (e.g. yoga pants, leggings, jeans, dress pants, etc.), shirts (e.g. t-shirts, tank tops, workout shirts, dress shirts, etc.), dresses, skirts, vests, undergarments (e.g. briefs, sport bras, etc.), outerwear (e.g. sweaters, hoodies, top coats, etc.), etc. Collision object 14 comprises models of objects cloth object 12 is intended to cover (e.g. muscle tissue, bone tissue, skin tissue, skin tissue that is at least partially clothed, etc.).

Since cloth object 12 is tight-fitting around collision object 14, cloth object 12 is typically in an equilibrium state (e.g. various forces acting on cloth object 12 are balanced). When cloth object 12 is in an equilibrium state, cloth object 12 typically does not move (e.g. flap, oscillate, etc.) relative to collision object 14. It therefore becomes unnecessary, with such tight-fitting cloth objects 12, to model dynamics of cloth object 12 such as wrinkles appearing in cloth object 12 and then disappearing under tension, wind moving a portion of cloth object 12 relative to collision object 14 and/or the like.

One aspect of the technology described herein provides a method for finding a dynamic equilibrium model of a desired cloth object with respect to a desired underlying collision object. In some embodiments the method performs an optimization of an energy function defining the cloth object to be modelled. Advantageously, the method generates a quasistatic simulation of the cloth object (i.e. the generated model of the cloth object is stateless such that any frame of an animation sequence can be modelled at any time (without having to model the state of the cloth at preceding time steps). Relative to dynamic simulations of cloth objects, a quasistatic simulation of cloth objects may improve efficiency, reduce time it takes to generate a simulation, reduce required computation power and/or the like.

Figure 2:
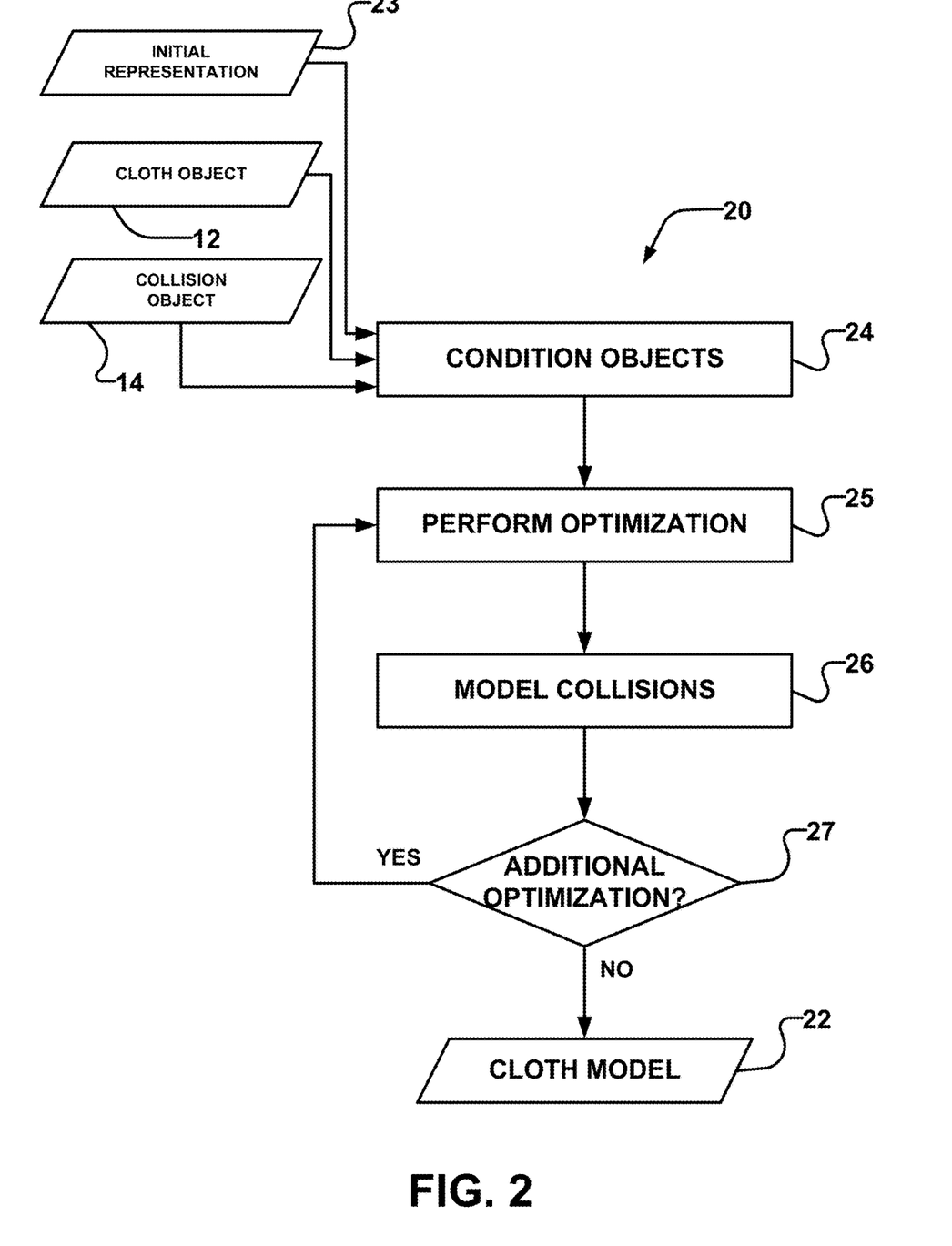
FIG. 2 is a block diagram of a method according to an example embodiment of the invention.

FIG. 2 is a block diagram of an example method 20 for generating a dynamic equilibrium model 22 of cloth object 12 according to a particular embodiment.

In block 24 method 20 receives objects that are to be modelled. In currently preferred embodiments block 24 receives cloth object 12 and underlying collision object 14. However, this is not necessary in all cases.

In some embodiments, block 24 may receive only one of cloth object 12 or collision object 14. In some such embodiments block 24 may retrieve and/or generate the other one of the objects from a database, library, etc. based on one or more features of the received object. For example, block 24 may receive an instance of collision object 14 (e.g. a human torso). Block 24 may then retrieve and/or generate a cloth object 12 (e.g. a skin object or a shirt covering the torso) based on one or more identified features of the collision object 14.

Block 24 may also initialize an initial state of cloth object 12. For example, cloth object 12 may be initialized based on one or more features identified in cloth object 12 and/or collision object 14. In some embodiments block 24 uses an artificial intelligence algorithm to initialize cloth object 12 based on the identified features of cloth object 12 and/or collision object 14.

In some embodiments block 24 additionally receives an initial guess or representation 23 of the optimized model for cloth object 12 from a user. In some embodiments an initial representation 23 of cloth object 12 may be generated by performing a linear blending (linear blend-skinning) technique or similar techniques, such as dual quaternion skinning, spherical blend-skinning and/or the like.

Once the objects to be modelled are received by method 20, block 24 involves conditioning the objects. Cloth object 12 and collision object 14 are typically represented by polygonal meshes (e.g. surface meshes). In currently preferred embodiments cloth object 12 and collision object 14 are represented by triangle meshes. If the representations of cloth object 12 and collision object 14 received by block 24 are not triangle meshes (e.g. one or both of cloth object 12 and collision objection 14 are provided in the form of other polygonal meshes or volume meshes), then block 24 may comprise converting the non-triangle mesh representations of cloth object 12 and collision object 14 into triangle mesh representations (e.g. triangular surface mesh representations).

In block 25, cloth object 12 is optimized. Cloth object 12 may be optimized by minimizing an elastic potential energy function representative of cloth object 12. The optimization preferably minimizes stretching and bending of cloth object 12. In some embodiments, the block 25 optimization adjusts vertex positions of the mesh of cloth object 12 until stretching and/or bending of cloth object 12 are minimized.

An elastic potential energy function representative of cloth object 12 may, for example, be represented as follows:

$$E = k_B(\text{Bending Energy Function}) + k_S(\text{Stretching Energy Function}) \quad (1A)$$

wherein: Bending Energy Function is an expression that assigns energy to bending of cloth object 12; Stretching Energy Function is an expression that assigns energy to stretching of cloth object 12; $k_B$ is a configurable (e.g. user-configurable) scalar weight parameter corresponding to the bending energy and $k_S$ is a configurable (e.g. user-configurable) scalar weight parameter corresponding to the stretching energy. In some embodiments, the potential energy function of equation (1A) may take the form:

$$E = k_B\left(\sum_{vertices,i} E(v_i)\right) + k_S\left(\sum_{triangles,j} E(\underline{F_j})\right) \quad (1B)$$

wherein: $E(v_i)$ corresponds to the bending energy of cloth object 12 at vertex $v_i$; i is an index of the vertices of cloth object 12; $E(\underline{F_j})$ corresponds to the stretching energy of cloth object 12 at a triangle j; $\underline{F_j}$ is a deformation gradient tensor for the triangle j; and j is an index of the triangles of cloth object 12.

In some embodiments, the bending energy $E(v_i)$ may, for example, be represented as follows:

$$E(v_i) = (|\vec{v_i} - \vec{v_i}'| - L_O)^2 A_i \quad (2)$$

wherein: $\vec{v_i}$ corresponds to the position of the $i^{th}$ vertex of cloth object 12; $\vec{v_i}'$ corresponds to average positions of the $i^{th}$ vertex's neighbors (e.g. vertices connected to the $i^{th}$ vertex by edges); $L_O$ corresponds to a desired distance between $\vec{v_i}$ and $\vec{v_i}'$, which may be a configurable (e.g. user-configurable) parameter of the block 24 optimization or which may be determined based on an initial (e.g. input configuration of the mesh corresponding to cloth object 12); and $A_i$ corresponds to the area of triangles (or other polygonal shapes of the mesh) associated with (e.g. that include) vertex $v_i$.

The stretching energy $E(\underline{F_j})$ may, for example, be represented as follows:

$$E(\underline{F_j}) = \|\underline{F_j} - \underline{R}(\underline{F_j})\|^2 A_j \quad (3)$$

wherein: $\underline{F_j}$ corresponds to the deformation gradient to transform the $j^{th}$ triangle (or other polygonal shape) from two dimensions (i.e. 2D) to three dimensions (i.e. 3D); and $\underline{R}(\underline{F_j})$ corresponds to a polar decomposition of $\underline{F_j}$.

The deformation gradient $\underline{F_j}$ may, for example be represented as follows:

$$\underline{F_j} = \underline{R_j} * \underline{S_j} \quad (4)$$

wherein: $R_j$ represents a rotation matrix associated with the deformation gradient of the $j^{th}$ triangle; and $S_j$ is a right stretch tensor that corresponds to an arbitrary amount of stretching for the $j^{th}$ triangle. The arbitrary amount of stretching may be set on a per triangle basis (i.e. for the $j^{th}$ triangle) as a configurable (e.g. user configurable) parameter of the block 24 optimization. In some embodiments, the arbitrary amount of stretching is determined as part of block 25.

In some embodiments, the elastic potential energy function representation of cloth object 12 includes a term accounting for gravitation forces. A term accounting for gravity may, for example, be represented as follows:

$$\ldots + k_g \left( \sum_{verticies, i} y_i \right) \ldots \quad (5)$$

wherein: $y_i$ corresponds to gravitational forces experienced by the $i^{th}$ vertex; and $k_g$ is a configurable scalar parameter corresponding to the gravitational energy. Such a gravitational term may be added (e.g. as an additional term) to equation (1A) or (1B).

Additionally or alternatively, the potential energy function representation of cloth object 12 may include a term accounting for air pressure. A term accounting for air pressure may, for example, be represented as follows:

$$\ldots + k_a \left( \sum_{verticies} (\vec{n}_i \cdot \vec{v}_i) A_i \right) \ldots \quad (6)$$

wherein: $\vec{n}_i$ is a normal vector extending from the $i^{th}$ vertex ($v_i$); $\underline{v}_i$ is the position of the $i^{th}$ vertex ($v_i$); $k_a$ is a configurable scalar parameter corresponding to the air pressure; and $A_i$ has the meaning described above.

Returning to FIG. 2, in block 26 collisions of cloth object 12 with outer surfaces of collision object 14 are modelled. In some embodiments, the collisions are modelled with inequality constraints. In some embodiments, such collisions could additionally or alternatively be modelled with: penalty term(s) in the cost function (e.g. in equations (1A), (1B) above), which heavily penalize interpenetrating collisions between cloth object 12 and collision object 14; and/or equality constraints that are activated in some iterations and deactivated in other iterations. Block 26 is shown in FIG. 2 as being separate from the block 25 optimization for clarity. It will be appreciated that the collision models of block 26 may be incorporated into the block 25 optimization (e.g. as constraints to the optimization or as terms in the cost function of equations (1A), (1B) as discussed above).

The inequality constraints on each vertex ($v_i$) of cloth object 12 may be defined by keeping track of a corresponding point ($p_i$) on a collision surface of collision object 14. The corresponding point ($p_i$) on collision object 14 may be defined and/or characterized by: an identification of the triangle (or other polygonal shape) in which $p_i$ is located in the mesh of collision object 14; and by the barycentric coordinates of $p_i$ relative to the vertices of collision object 14 that define the identified triangle. The corresponding point ($p_i$) on collision object 14 may be initialized by taking the closest point to vertex ($v_i$) in a reference pose or initial state of cloth object 12 (e.g. initial representation 23).

Each time a new optimization (method 20) is performed for cloth object 12, points ($p_i$) may be started at their initial reference positions. Block 26 may track points ($p_i$) every time vertex positions ($v_i$) of cloth object 12 are updated (e.g. in each iteration of method 20). In some embodiments, block 26 tracks points ($p_i$) by moving points ($p_i$) along the collision surface of collision object(s) 14 until it is not possible to get any closer to the corresponding cloth object vertex ($v_i$).

In some embodiments, the inequality constraint on the position of vertex ($v_i$) comprises defining a tangent plane at point ($p_i$) on collision object 14 and ensuring that vertex ($v_i$) does not penetrate the tangential plane at point ($p_i$). A normal vector of the tangential plane may be defined by smoothly interpolating a normal vector ($\vec{n}_i$) from the normal vectors of collision object vertices ($u_{i,1}$, $u_{i,2}$, $u_{i,3}$) corresponding to the collision object triangle that includes the point ($p_i$). Such normal vector interpolation may be based on the barycentric coordinates of the point ($p_i$) relative to collision object vertices ($u_{i,1}$, $u_{i,2}$, $u_{i,3}$). For example, where the vertices ($u_{i,1}$, $u_{i,2}$, $u_{i,3}$) of the collision object triangle that include the point ($p_i$) have associated normal vectors ($\vec{n}_{i,1}$, $\vec{n}_{i,2}$, $\vec{n}_{i,3}$) and the point ($p_i$) has barycentric coordinates ($\lambda_{i,1}$, $\lambda_{i,2}$, $\lambda_{i,3}$) within the collision object triangle, then the normal vector ($\vec{n}_i$) of the tangent plane at point ($p_i$) may be interpolated according to $\vec{n}_i = \lambda_{i,1} \vec{n}_{i,1} + \lambda_{i,2} \vec{n}_{i,2} + \lambda_{i,2} \vec{n}_{i,2}$. It is typically advantageous to define the normal vector ($\vec{n}_i$) of the tangent plane at point ($p_i$) by smoothly interpolating normal vectors ($\vec{n}_{i,1}$, $\vec{n}_{i,2}$, $\vec{n}_{i,3}$) of the collision object vertices ($u_{i,1}$, $u_{i,2}$, $u_{i,3}$) that include the point ($p_i$), since a "geometric normal" of the collision surface (i.e. a normal to the plane that includes the vertices ($u_{i,1}$, $u_{i,2}$, $u_{i,3}$) is typically discontinuous, which can lead to undesirable effects, such as jittering or jumping between discrete configurations being introduced into the model of cloth object 12. It will be appreciated that geometric normal may change discontinuously from a point on one side of a triangle edge to a point on another side of the edge (i.e. on a different triangle). A normal vector ($\vec{n}_i$) interpolated from the individual normal vectors ($\vec{n}_{i,1}$, $\vec{n}_{i,2}$, $\vec{n}_{i,3}$) at the plurality of vertices ($u_{i,1}$, $u_{i,2}$, $u_{i,3}$) corresponding to a triangle does not suffer from this same discontinuity.

In some embodiments, one form of suitable inequality constraint is defined as follows:

$$(\vec{v}_i - \vec{p}_i) \cdot \vec{n}_i \geq 0. \quad (7)$$

wherein: $\vec{v}_i$ is a position of the $i^{th}$ vertex ($v_i$) on cloth object 12; $\vec{p}_i$ is a position of the point ($p_i$) on a collision surface (collision object 14) that is closest to the vertex $v_i$; and $\vec{n}_i$ is the normal vector interpolated from the individual normal vectors ($\vec{n}_{i,1}$, $\vec{n}_{i,2}$, $\vec{n}_{i,3}$) at the plurality of vertices ($u_{i,1}$, $u_{i,2}$, $u_{i,3}$) that define the collision object triangle that includes the point ($p_i$). It will be appreciated that the inequality of equation (7) requires that the vector ($\vec{v}_i - \vec{p}_i$) has the same direction as the vector $\vec{n}_i$, which is tantamount to preventing interpenetrating collisions between the cloth object vertex ($v_i$) and the tangent plane at the collision object point ($p_i$) (as defined by the interpolated normal vector $\vec{n}_i$.

In some embodiments, method 20 (e.g. block 25 and/or block 26) uses an iterative method to handle optimization and the associated inequality constraints. In some embodiments, a Gauss Seidel solver is used to handle the optimization of an energy function (e.g. equation (1A) or (1B)) subject to the inequality constraints (e.g. equation (7)). In some embodiments, other types of solvers, such as an active set OP solver, interior point method solver and/or the like, may additionally or alternatively be used to handle the inequality constraints.

In some embodiments, the simulation and collisions are modelled with a method as described in "ADMM⊇2 Projective Dynamics: Fast Simulation of Hyperelastic Models with Dynamic Constraints" by M. Overyby, G. Brown, J. Li and R. Narain. The described method may be adapted to generate a quasistatic model by setting all masses to zero.

Although blocks 25 and 26 are illustrated sequentially for ease of description, blocks 25 and 26 need not occur sequentially. In some embodiments block 25 and 26 are performed concurrently (e.g. by the same solver). In some embodiments block 26 is performed prior to block 25 being performed.

In block 27 method 20 determines whether the model of cloth object 12 is sufficient or whether additional optimization iterations should be performed. Any suitable loop-exit criteria may be used in the block 27 evaluation. In some embodiments, the block 27 loop-exit criteria is a configurable (e.g. user configurable) number of iterations, although other loop-exit criteria could be used. In some embodiments a user determines whether additional optimization iterations should be performed. If additional optimizations are to be performed block 27 returns method 20 to block 25. Otherwise block 27 outputs optimized model 22 (i.e. a quasistatic simulation model) of cloth object 12.

Example Application

In some cases the methods described herein (e.g. method 20) may form the basis of a computer program, a plug-in to be added to an existing computer program and/or the like. For example, the methods described herein may be incorporated into a plug-in deformer for the Maya™ 3D computer animation modeling software application which is commercially available from Autodesk™, Inc. of California, United States. The methods described herein may be incorporated into a plug-in deformer for other computer animation modelling software, such as, by way of non-limiting example, 3D Studio Max™, Blender™, Houdini™ and/or the like.

The plug-in (or computer program more generally) may be configured to prompt a user for one or more of the following:
- a cloth object (i.e. the object that is to be simulated (e.g. cloth object 12));
- a rest state for the cloth object (e.g. initial representation 23); and
- a collision object (i.e. the object that the cloth object at least partially covers (e.g. collision object 14)).

In some embodiments, the collision object 14 and/or the cloth object 12 may be specified by some other piece of software (e.g. animation software).

The plug-in (or computer program) outputs a simulation (cloth model 22) of the cloth object 12 given the configuration of the collision object 14. As described elsewhere herein, the output cloth object (cloth model 22) is a quasi-static simulation of the cloth object 12 (e.g. given the configuration of collision object 14) after relaxation. The output cloth object (cloth model 22) typically has also undergone several effects such as wrinkling, sliding, etc., as the cloth object 12 is interacted with the collision object 14 during the simulation. A typical animation comprises a number of frames per second. Each frame of such an animation may have a different configuration for collision object 14. For example, various frames and corresponding configurations of collision object 14 may be generated by a suitable simulation of a musculoskeletal animation model (e.g. an animation rig) or various frames and corresponding configurations of collision object 14 may be generated by artist(s). For each such frame of collision object 14, method 20 may be used to generate a corresponding cloth model 22 (i.e. a corresponding quasistatic configuration of cloth object 12). In some embodiments, the initial representation 23 of cloth object 12 for each frame (each instance of method 20) may be the cloth model 22 (i.e. the configuration of cloth object 12) from the previous frame.

In some embodiments, the plug-in (or computer program) allows for additional user constraints to be added to the simulation. Additionally, or alternatively, the plug-in (or computer program) may allow a user to vary one or more properties of the cloth object 12 and/or the collision object 14. For example, the plug-in (or computer program) may permit a user to vary:
- an amount of attraction of cloth object 12 to an original or a previous pose (configuration) of cloth object 12;
- one or more other properties of cloth object 12, such as tensile strength, bending resistance, mass density, thickness of the cloth, abrasion resistance, smoothness, pilling propensity, fastness of dyestuffs, etc.
- etc.

Additional user constraints and/or physical properties of the simulation may be varied by a user in a number of ways. In some embodiments a user may paint maps to vary constraints or physical properties of the simulation. In some embodiments a user may numerically vary constraints or physical properties through a graphical user interface.

In some embodiments, the methods described herein may be used to generate training data for other artificial intelligence and/or machine learning techniques. For example, U.S. patent application Ser. No. 17/676,087 (which is hereby incorporated herein by reference) describes a machine learning technique for performing elaborate deformations of a CGI character skin or clothing at real time frame rates. Some of the techniques described in U.S. patent application Ser. No. 17/676,087 do not model dynamics. Methods according to particular embodiments of the current invention may be able generate a quality cloth and/or skin simulation that also is free of dynamics. Such cloth and/or skin simulations developed by the techniques described herein, can be used as training data for the machine learning techniques described in U.S. patent application Ser. No. 17/676,087, which in turn can be used to obtain real time (at an animation frame rate) skin/cloth deformations Interpretation of Terms Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for generating a quasistatic simulation model of a cloth object for use in a computer-based animation simulation, the method comprising:
   receiving a mesh representation of the cloth object, the cloth object mesh representation comprising: a plurality of cloth vertices and locations of the plurality of cloth vertices in a three-dimensional (3D) coordinate system and cloth edges connecting pairs of cloth vertices to define cloth triangles of a triangular cloth surface mesh;
   receiving a collision object mesh representation of a collision object, the collision object mesh representation comprising: a plurality of collision-object vertices and the locations of the plurality of collision-object vertices in the 3D coordinate system and collision-object edges connecting pairs of collision-object vertices to define collision-object triangles of a triangular collision-object surface mesh;
   performing an iterative optimization which minimizes an energy function comprising a stretching term representative of a stretching energy of the cloth object and a bending term representative of a bending energy of the cloth object to thereby obtain a dynamic equilibrium model of the cloth object;
   wherein the stretching term and the blending term are based at least in part on the cloth object mesh representation; and
   wherein performing the iterative optimization comprises modelling collisions of the cloth object with the collision object.

2. The method of claim 1 wherein performing the iterative optimization comprises performing a constrained optimization wherein minimizing the energy function is subject to one or more inequality constraints which prevent interpenetrating collisions of the cloth object with the collision object.

3. The method of claim 2 wherein performing the iterative optimization comprises, for each cloth vertex ($v_i$) from among a plurality of cloth vertices, tracking a point ($p_i$) on the collision object that is closest to the cloth vertex ($v_i$) through each iteration of the iterative optimization.

4. The method of claim 3 wherein tracking the point ($p_i$) on the collision object comprises:
   identifying a collision-object triangle to which the point ($p_i$) belongs; and
   determining barrycentric coordinates for the point ($p_i$) relative to the collision-object vertices ($u_{i,1}, u_{i,2}, u_{i,3}$) of the identified collision-object triangle.

5. The method of claim 4 wherein performing the iterative optimization comprises, for each cloth vertex ($v_i$) from among the plurality of cloth vertices:
   determining a plane that is tangent to collision object at the point ($p_i$); and
   requiring that the cloth vertex ($v_i$) does not cross the plane that is tangent to the collision object at the point ($p_i$).

6. The method of claim 5 comprising determining a normal vector $\vec{n}_i$ to the plane that is tangent to the collision object at the point ($p_i$) and wherein requiring that the cloth vertex ($v_i$) does not cross the plane that is tangent to the collision object at the point ($p_i$) comprises imposing an inequality constraint of the form:

$$(\vec{v}_i - \vec{p}_i) \cdot \vec{n}_i \geq 0. \quad (7)$$

wherein: $\vec{v}_i$ is a position of the cloth vertex ($v_i$); $\vec{p}_i$ is a position of the point ($p_i$) on the collision object; and $\vec{n}_i$ to the plane that is tangent to the collision object at the point ($p_i$).

7. The method of claim 6 wherein determining the normal vector $\vec{n}_i$ to the plane that is tangent to the collision object at the point ($p_i$) comprises interpolating individual normal vectors ($\vec{n}_{i,1}, \vec{n}_{i,2}, \vec{n}_{i,3}$) at a plurality of collision-object vertices ($u_{i,1}, u_{i,2}, u_{i,3}$) that define the collision object triangle that includes the point ($p_i$).

8. The method of claim 7 wherein determining the normal vector $\vec{n}_i$ to the plane that is tangent to the collision object at the point ($p_i$) comprises interpolating individual normal vectors ($\vec{n}_{i,1}, \vec{n}_{i,2}, \vec{n}_{i,3}$) according to an equation of the form $\vec{n}_i = \lambda_{i,1} \vec{n}_{i,1} + \lambda_{i,2} \vec{n}_{i,2} + \lambda_{i,2} \vec{n}_{i,2}$ wherein ($\lambda_{i,1}, \lambda_{i,2}, \lambda_{i,3}$) are the barycentric coordinates of the point ($p_i$) relative to the collision-object vertices ($u_{i,1}, u_{i,2}, u_{i,3}$) of the collision object triangle that includes the point ($p_i$).

9. The method of claim 8 wherein the energy function comprises an equation of the form:

$$E = k_B \left( \sum_{verticies, i} E(v_i) \right) + k_S \left( \sum_{triangles, j} E(F_j) \right) \quad (1B)$$

wherein: $k_B(\Sigma_{verticies,i} E(v_i))$ is the bending term; $k_S(\Sigma_{triangles,j} E(F_j))$ is the stretching term; $k_B$ is a configurable weight parameter corresponding to the bending energy; $k_S$ is a configurable weight parameter corresponding to the stretching energy; $E(v_i)$ is a bending energy metric of the cloth object at an $i^{th}$ cloth vertex $v_i$; i is an index of the cloth vertices; $E(F_j)$ is a stretching energy metric of the cloth object at a cloth triangle j; $F_j$ is a deformation gradient tensor for the $j^{th}$ cloth triangle; and j is an index of the cloth triangles.

10. The method of claim 9 wherein the bending energy metric $E(v_i)$ is given by an equation of the form:

$$E(v_i) = (|\vec{v}_1 - \vec{v}_1'| - L_O)^2 A_i \quad (2)$$

wherein: $\vec{v}_1$ is the location of the $i^{th}$ cloth vertex $v_i$; $\vec{v}_1'$ is an average of the locations of the cloth vertices that are neighbors to the $i^{th}$ cloth vertex $v_i$; $L_O$ is a desired distance between $\vec{v}_1$ and $\vec{v}_1'$; and $A_i$ corresponds to an area of the cloth triangles that include the $i^{th}$ cloth vertex $v_i$.

11. The method of claim 1 wherein the energy function comprises one or more cost terms which penalize interpenetrating collisions between the cloth object and the collision object.

12. The method of claim 1 wherein the energy function comprises an equation of the form:

$$E = k_B \left( \sum_{verticies, i} E(v_i) \right) + k_S \left( \sum_{triangles, j} E(F_j) \right) \quad (1B)$$

wherein: $k_B(\Sigma_{verticles,i}E(v_i))$ is the bending term; $k_S(\Sigma_{triangles,j}E(F_j))$ is the stretching term; $k_B$ is a configurable weight parameter corresponding to the bending energy; $k_S$ is a configurable weight parameter corresponding to the stretching energy; $E(v_i)$ is a bending energy metric of the cloth object at an $i^{th}$ cloth vertex $v_i$; i is an index of the cloth vertices; $E(F_j)$ is a stretching energy metric of the cloth object at a cloth triangle j; $F_j$ is a deformation gradient tensor for the $j^{th}$ cloth triangle; and j is an index of the cloth triangles.

13. The method of claim 12 wherein the bending energy metric $E(v_i)$ is given by an equation of the form:

$$E(v_i) = (|\vec{v_t} - \vec{v_t}'| - L_O)^2 A_i \qquad (2)$$

wherein: $\vec{v_t}$ is the location of the $i^{th}$ cloth vertex $v_i$; $\vec{v_t}'$ is an average of the locations of the cloth vertices that are neighbors to the $i^{th}$ cloth vertex $v_i$; $L_O$ is a desired distance between $\vec{v_t}$ and $\vec{v_t}'$; and $A_i$ corresponds to an area of the cloth triangles that include the $i^{th}$ cloth vertex $v_i$.

14. The method of claim 13 wherein the stretching energy metric $E(F_j)$ is given by an equation of the form:

$$E(F_j) = \|F_j - R(F_j)\|^2 A_i \qquad (3)$$

wherein: $R(F_j)$ corresponds to a polar decomposition of $F_j$.

15. The method of claim 13 wherein the stretching energy metric $E(F_j)$ is given by an equation of the form:

$$E(F_j) = \|F_j - R(F_j)\|^2 A_i \qquad (3)$$

wherein: $R(F_j)$ corresponds to a polar decomposition of $F_j$.

16. The method of claim 12 wherein the stretching energy metric $E(F_j)$ is given by an equation of the form:

$$E(F_j) = \|F_j - R(F_j)\|^2 A_i \qquad (3)$$

wherein: $R(F_j)$ corresponds to a polar decomposition of $F_j$.

17. The method of claim 16 wherein the deformation gradient tensor $F_j$ for the $j^{th}$ cloth triangle is given by an equation of the form:

$$F_j = R_j * S_j \qquad (4)$$

wherein: $R_j$ represents a rotation matrix and $S_j$ is a right stretch tensor.

18. The method of claim 12 wherein the energy function further comprises a gravitational term representative of gravitational forces acting on the cloth object and the energy function comprises an equation of the form:

$$E = k_B\left(\sum_{verticies,i} E(v_i)\right) + k_S\left(\sum_{triangles,j} E(F_j)\right) + k_g\left(\sum_{verticies,i} y_i\right)$$

wherein: $y_i$ corresponds to gravitational forces experienced by the $i^{th}$ vertex; and $k_g$ is a configurable weight parameter corresponding to the corresponding to the gravitational energy.

19. The method of claim 12 wherein the energy function further comprises an air pressure term representative of air pressure acting on the cloth object and the energy function comprises an equation of the form:

$$E = k_B\left(\sum_{verticies,i} E(v_i)\right) + k_S\left(\sum_{triangles,j} E(F_j)\right) + k_a\left(\sum_{verticies} (\vec{n_t} \cdot \vec{v_t}) A_i\right)$$

wherein: $\vec{n_t}$ is a normal vector extending from the $i^{th}$ vertex $(v_i)$; and $k_a$ is a constant corresponding to the air pressure.

20. The method of claim 12 wherein the energy function further comprises a gravitational term representative of gravitational forces acting on the cloth object and an air pressure term representative of air pressure acting on the cloth object and the energy function comprises an equation of the form:

$$E = k_B\left(\sum_{verticies,i} E(v_i)\right) + k_S\left(\sum_{triangles,j} E(F_j)\right) + k_g\left(\sum_{verticies,i} y_i\right) + k_a\left(\sum_{verticies} (\vec{n_t} \cdot \vec{v_t}) A_i\right)$$

wherein: $y_i$ corresponds to gravitational forces experienced by the $i^{th}$ vertex; $k_g$ is a configurable weight parameter corresponding to the corresponding to the gravitational energy; $\vec{n_t}$ is a normal vector extending from the $i^{th}$ vertex $(v_i)$; and $k_a$ is a constant corresponding to the air pressure.

* * * * *